United States Patent
Jacob et al.

(10) Patent No.: US 6,698,294 B2
(45) Date of Patent: Mar. 2, 2004

(54) PRESSURE CELL WITH TEMPERATURE SENSORS AND PRESSURE MEASURING METHOD

(75) Inventors: Joern Jacob, Wolfach-Kirnbach (DE); Ewald Boehler, Wolfach (DE)

(73) Assignee: Vega Grieshaber KG, Wolfach (DE)

( * ) Notice: Subject to any disclaimer, the term of this patent is extended or adjusted under 35 U.S.C. 154(b) by 0 days.

(21) Appl. No.: 09/917,693

(22) Filed: Jul. 31, 2001

(65) Prior Publication Data

US 2002/0026835 A1 Mar. 7, 2002

Related U.S. Application Data

(60) Provisional application No. 60/273,337, filed on Mar. 6, 2001.

(30) Foreign Application Priority Data

Sep. 7, 2000 (DE) .......................................... 100 44 078

(51) Int. Cl.⁷ .............................................. G01L 19/04
(52) U.S. Cl. ............................. 73/708; 73/721; 73/723; 73/727
(58) Field of Search ............................ 606/151; 73/708, 73/715, 721, 724, 718, 714, 723, 727; 361/283.1–283.4

(56) References Cited

U.S. PATENT DOCUMENTS

| | | | | |
|---|---|---|---|---|
| 4,141,252 A | * | 2/1979 | Lodge ........................ | 73/724 |
| 4,178,621 A | * | 12/1979 | Simonelic et al. ........ | 361/283.4 |
| 4,422,335 A | * | 12/1983 | Ohnesorge et al. ........... | 73/724 |
| 4,711,130 A | * | 12/1987 | Glas et al. .................... | 73/708 |
| 5,257,542 A | * | 11/1993 | Voss ............................. | 73/724 |
| 5,259,248 A | * | 11/1993 | Ugai et al. .................... | 73/721 |
| 5,383,367 A | | 1/1995 | Bertrand et al. | |
| 5,394,345 A | | 2/1995 | Berard et al. | |
| 5,712,428 A | * | 1/1998 | Schleiferbock .............. | 73/708 |
| 6,016,706 A | * | 1/2000 | Yamamoto et al. ........... | 73/727 |
| 6,363,790 B1 | * | 4/2002 | Flogel et al. ................. | 73/708 |
| 6,439,056 B1 | * | 8/2002 | Jonsson ....................... | 73/708 |

FOREIGN PATENT DOCUMENTS

| | | |
|---|---|---|
| DE | 40 11 901 | 10/1991 |
| DE | 41 11 118 | 10/1992 |
| EP | 0 764 839 | 3/1997 |
| FR | 2 615 618 | 11/1998 |

* cited by examiner

*Primary Examiner*—Andrew H. Hirshfeld
*Assistant Examiner*—Marissa Ferguson
(74) *Attorney, Agent, or Firm*—Nath & Associates PLLC; Marvin C. Berkowitz; Jerald L. Meyer

(57) ABSTRACT

A pressure cell contains a base body (1), a membrane (2) that is arranged on the base body (1) and can be deformed by a pressure to be measured, as well as a first and a second temperature sensor. The second temperature sensor is spaced apart from the first temperature sensor in the direction of a temperature gradient. Temperature shocks of the measuring cell can be determined and compensated by monitoring the difference between the temperatures measured by the sensors or changes in the temperatures measured by a sensor.

11 Claims, 4 Drawing Sheets

PRESSURE CELL WITH TEMPERATURE SENSORS AND PRESSURE MEASURING METHOD

Figure 1:
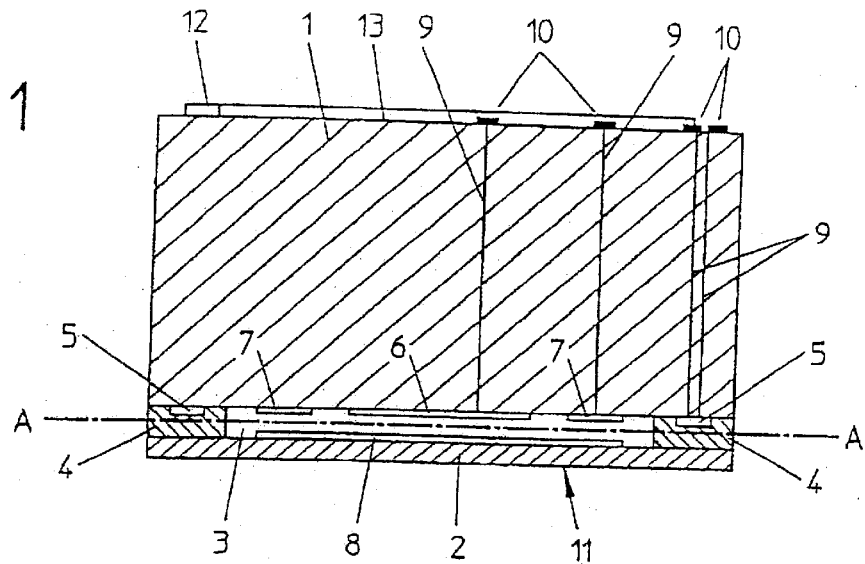

This application is a nonprovisional of U.S. provisional application no. 60/273,337 filed Mar. 6, 2001.

The present invention pertains to a pressure cell with a temperature sensor and a method for measuring pressure with such sensor. Temperature sensors are frequently integrated into pressure cells in order to compensate the static temperature error occurring during the pressure measurement. In ceramic pressure cells, the temperature sensor is usually applied onto the rear side of the ceramic. Alternatively, the temperature sensor may also be contained in downstream evaluation electronics.

If the pressure cell is in thermal equilibrium with its surroundings, the temperature dependence of the pressure measurement can be adequately compensated with such temperature sensor and suitable subsequent processing of the measuring signal. However, rapid changes in the temperature can lead to significant measuring errors that cannot be meaningfully compensated with known methods. This problem can arise in various types of pressure cells, but is particularly severe in ceramic measuring cells with flat membranes.

In order to solve this problem, the present invention proposes to arrange two temperature sensors in a pressure cell with a base body and a membrane that is arranged on the base body and can be deformed by the pressure to be measured such that they [said sensors] are spaced apart in the direction of an expected temperature gradient.

In most instances in which the pressure cell is not in thermal equilibrium, a difference in temperature can be expected between a medium acting upon the membrane of the measuring cell and the rear side of the pressure cell which faces away from the medium and is thermally connected to the surroundings, i.e., a temperature gradient from the front side to the rear side of the pressure cell results. Consequently, the first temperature sensor preferably is arranged on the membrane that forms the front side of the pressure cell where it is able to rapidly follow temperature changes of the medium, and the second temperature sensor is arranged on the rear side of the base body of the measuring cell which faces away from the membrane.

This proposition is based on the notion that the errors in the pressure measuring value caused by temperature changes can be traced back to an internal deformation of the measuring cell caused by a temperature gradient. If the membrane of the measuring cell is subjected to an abruptly heated medium, the membrane is able to follow this change in temperature significantly faster than the base body of the measuring cell which is spaced apart from the membrane by an intermediate space or a chamber and thermally insulated from the fluid. However, a rigid connection between the membrane and the base body prevents the membrane from expanding freely. This means that the thermal expansion causes the membrane to curve. This curvature—either toward the base body or away from the base body—causes the errors in the pressure measurement. According to the invention, the determination of a temperature gradient makes it possible to recognize when the risk of a curvature of the membrane which could falsify the measuring value exists, and, if such a risk exists, to ignore the measuring values of the pressure cell or to compensate said measuring values by taking into consideration the membrane curvature.

A typical distance between the first temperature sensor and outer surface of the membrane which is subjected to the pressure to be measured lies between 0.1 and 3 mm depending on the thickness of the membrane, i.e., depending on the dimensions of the pressure cell and the intensity of the pressures to be measured.

In order to ensure efficient heat transfer between the medium and the first temperature sensor, the first temperature sensor is advantageously embedded in a material layer that connects the base body and the membrane.

It is particularly advantageous to embed the first temperature sensor in a seal that seals a chamber formed between the base body and the membrane.

In a pressure cell in which the base body and/or membrane consist(s) of a ceramic material, such a seal is advantageously manufactured from glass.

The respective temperature sensors preferably contain a resistance element with a temperature-dependent resistance value. Such a resistance element can be easily produced in a flat fashion such that it extends merely over a short distance in the direction of the expected temperature gradient.

In order to obtain a high-intensity temperature measuring signal with the least possible noise, it is practical that the resistance element of the first temperature sensor extend over essentially the entire circumference of the measuring cell. One side effect of this arrangement of the resistance element is that the temperature value determined from the resistance value of the resistance element represents an average value over essentially the entire circumference of the membrane such that this temperature value comes very close to an average value over the entire surface of the membrane.

In order to accommodate a long conductor length of the resistance element on a given circumferential length of the seal, the resistance element is preferably realized in a meander-shaped fashion.

Figure 2:
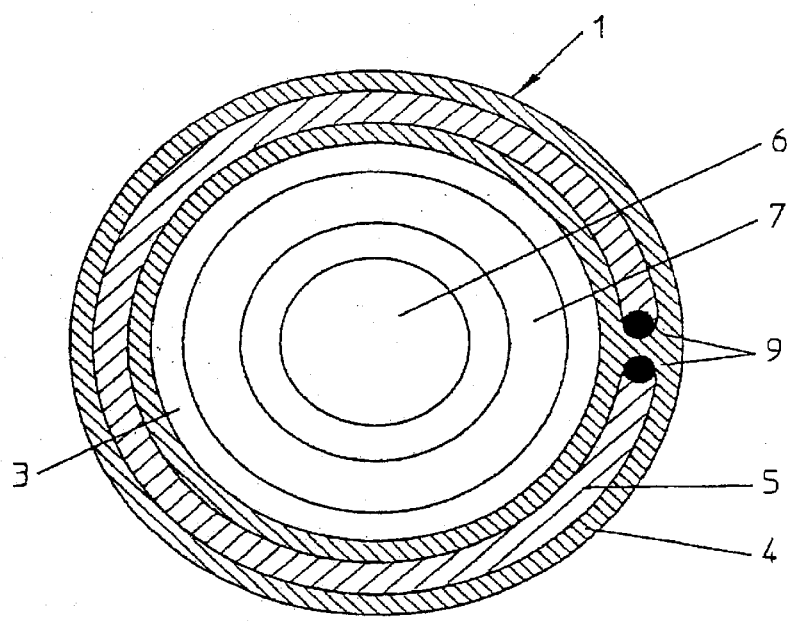
Figure 3:
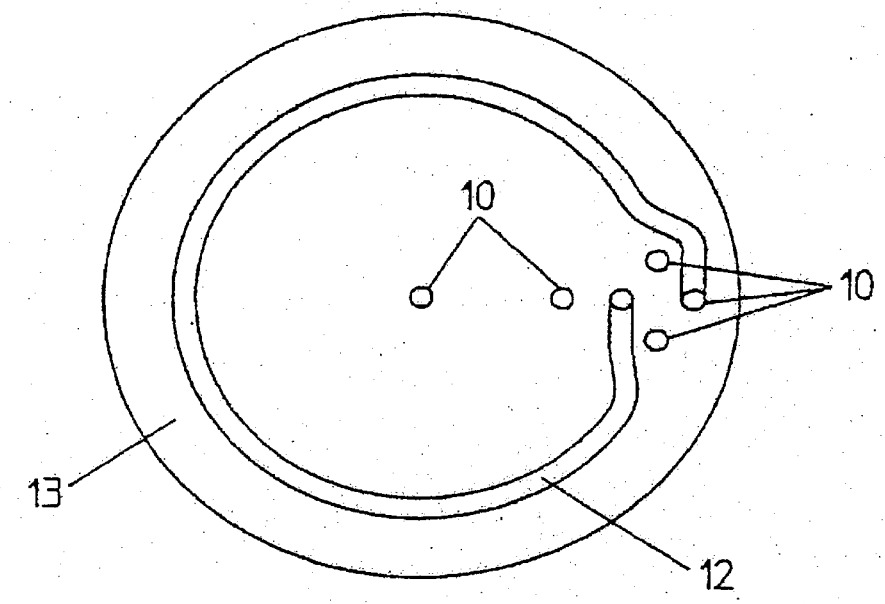
Figure 4:
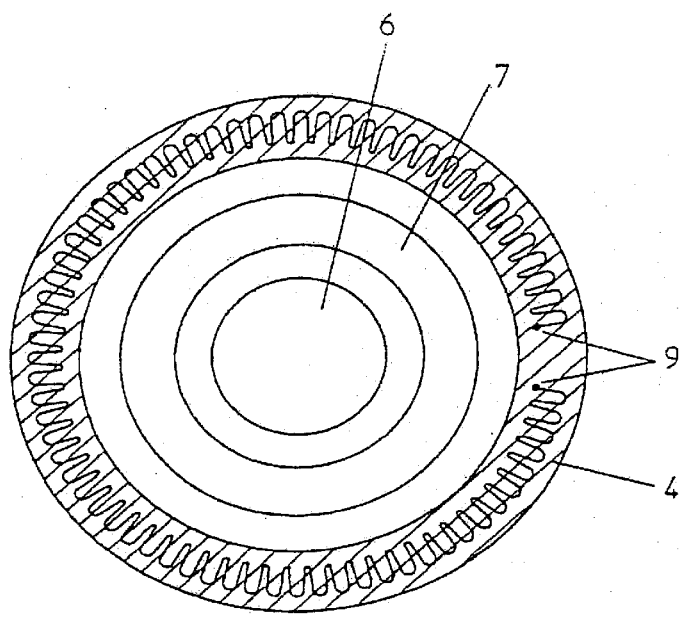
Figure 5:
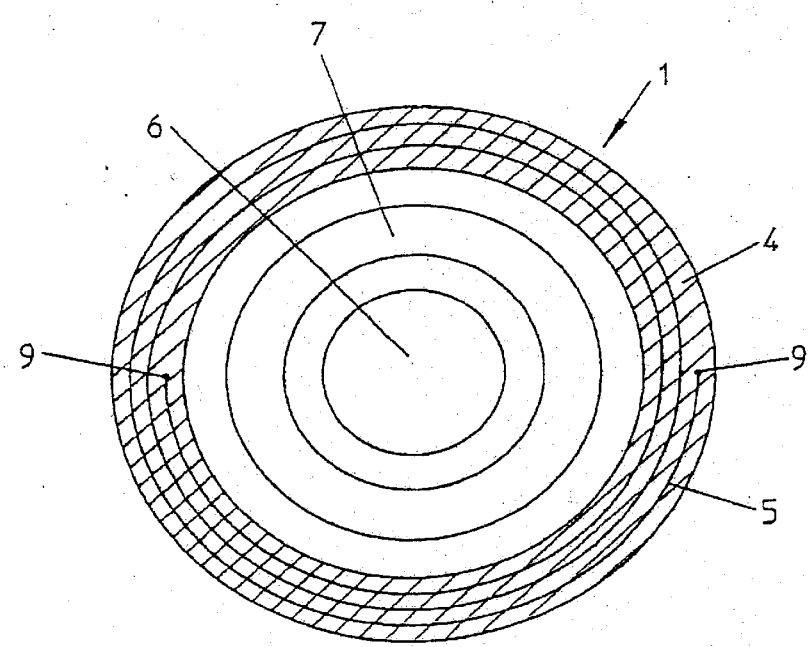
Figure 6:
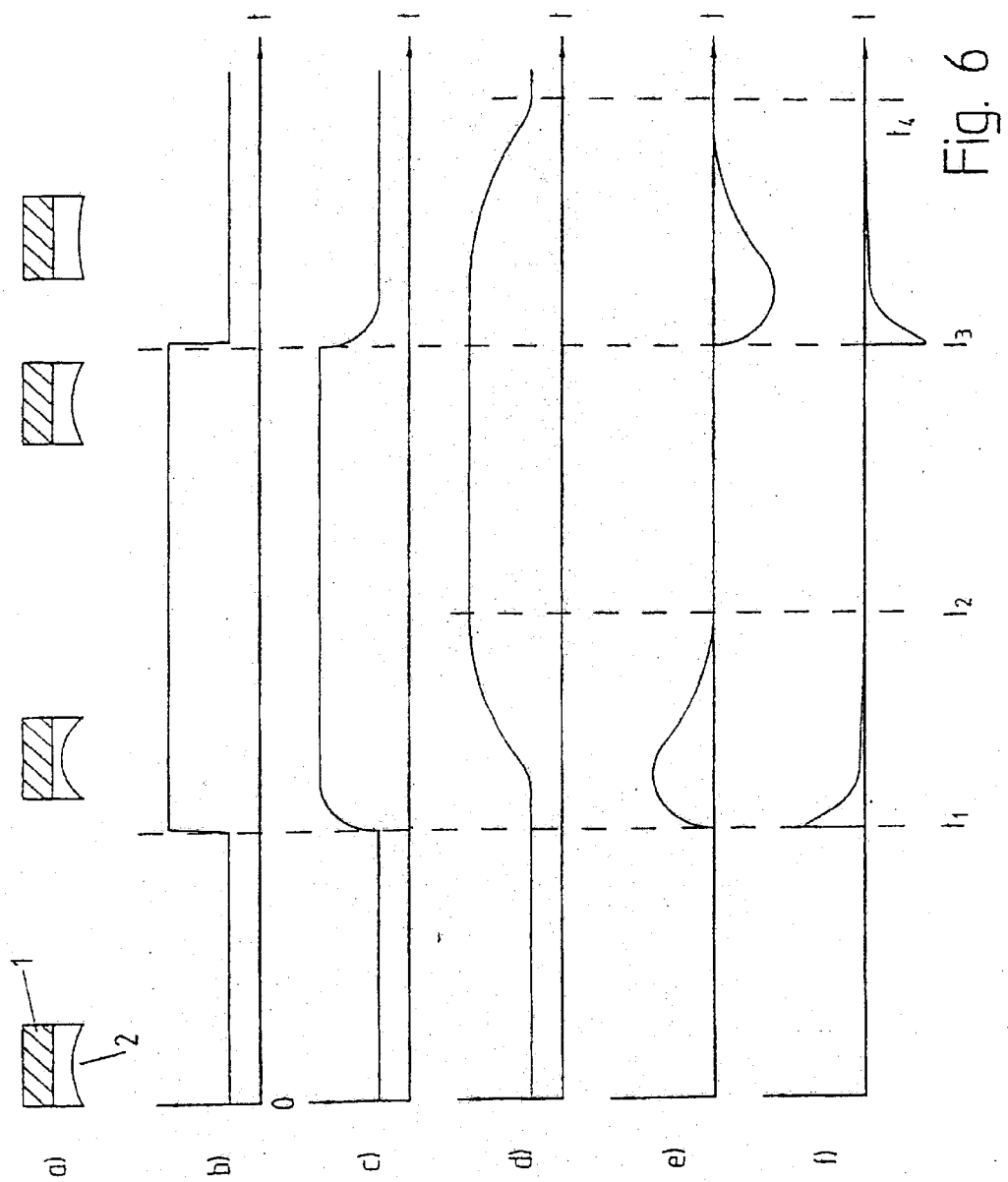

Additional characteristics and advantages of the invention are discussed in the following description of one embodiment which refers to the enclosed figures. The figures show:

FIG. 1, an axial section through a pressure cell according to the invention;

FIG. 2, a section through the pressure cell according to FIG. 1 along the plane A—A;

FIG. 3, a top view of the rear side of the base body of the pressure cell shown in FIG. 1;

FIGS. 4 and 5, respective sections through modified embodiments of the pressure cell according to FIG. 1 along the plane A—A, and FIG. 6, an exemplary time history of the measuring signal of the temperature sensors.

FIG. 1 shows a first section through the pressure cell according to the invention. The pressure cell contains an essentially cylindrical base body 1 and a membrane 2 which respectively consist of a ceramic material and are spaced apart from one another by a material layer 4 that annularly extends along the edges of the end faces of the base body 1 and the membrane 2 which face one another. The material layer 4 consists of a glass material. This material layer tightly encloses a flat cylindrical chamber 3 together with the base body 1 and the membrane 2. In the region of the chamber 3, the end face of the base body 1 carries a centrally arranged electrode 6 and an annular electrode 7 that extends concentric thereto. Through-contacts 9 connect the two electrodes to two connection areas 10 on the rear side of the base body 1. The membrane 2 carries a contacted counter-electrode 4 [sic; 8] on the opposite side of the chamber 3. The membrane 2 can be deformed by the pressure of a medium acting upon its outer surface 11. The deformation of the membrane changes the capacitance of the capacitor formed by the electrodes 6, 7, 8. This capacitance or a variable derived therefrom can be interpreted as the pressure measuring signal of the measuring cell which [signal] is not temperature-compensated. Such derived variable may, for example, consist of the resonant frequency of an oscillating circuit that contains the pressure cell as a capacitor.

A first temperature sensor is formed by a resistance element 5 with a temperature-dependent resistance value which is embedded in the material layer 4 that acts as a seal for the chamber 3. The two opposite ends of the long resistance element 5 are connected to connection areas 10 on the rear side of the base body 1 via through-contacts 9.

In the embodiment shown in FIG. 1, the resistance element 5 is in direct contact with the surface of the base body 1 and separated from the membrane 2 by part of the material layer 4. The direct arrangement of the resistance element 5 on the base body 1 simplifies the realization of electric connection between the resistance element and the surroundings via the through-contacts 9. The surface of the resistance element 5 which faces away from the base body 1 forms a large surface for realizing a heat exchange with the material layer 4 and via this material layer, with the membrane 2 and the (not-shown) medium that exerts the pressure to be measured upon the membrane 2.

A second temperature sensor is formed by a resistance element 12 with a temperature-dependent resistance value which is arranged on the rear side 13 of the base body 1 that faces away from the membrane 2. In order to protect the resistance element 12 from damage, it may be coated with a protective layer that is not illustrated in the figure and may have the same composition as the material layer 4.

FIG. 2 shows the temperature-dependent resistance element 5 that acts as the first temperature sensor in greater detail in the form of a section along the plane A—A in FIG. 1.

The top view of FIG. 2 shows the central electrode 6 and the annular electrode 7 of the base body 1, as well as the material layer 4 arranged concentric thereto on the edge of the base body 1. The temperature-dependent resistance element 5 extends over nearly the entire circumference of the base body 1 in the interior of the material layer 4. This resistance element is only interrupted between the two through-contacts 9 that serve for supplying the resistance element 5 with a measuring current.

FIG. 3 shows a top view of the rear side 13 of the base body 1. The resistance element 12 that acts as the second temperature sensor essentially extends over practically the entire circumference of the base body between two connection areas 10 analogous to the resistance element 5.

The pressure cell can be easily manufactured by initially forming the temperature-dependent resistance element 5 on the base body 1 by means of thick-layer or thin-layer technology, whereafter a precursor material for the material layer 4 is applied onto the resistance element and the membrane 2 is arranged on the precursor material. When the precursor material is heated and vitrified, the glass-like material layer 4 thus formed comes in intimate contact with the base body 1 and the resistance element 5 on one side and the membrane 2 on the other side. This not only ensures that the chamber 2 [sic; 3] is tightly sealed relative to the medium, the pressure of which should be measured, but also allows highly efficient heat exchange from the membrane 2 that is in contact with the medium and the resistance element 5 via the material layer 4. The manufacture of the resistance element 12 may be realized in the same fashion.

Depending on the intended measuring range of the pressure cell and the required stability of the membrane 2, the distance between the outer surface 11 of the membrane and the resistance element 5 typically lies between 0.1 and 3, preferably between 0.2 and 2 mm.

FIGS. 4 and 5 respectively show sections through modified embodiments of the temperature-dependent resistance element 5 that acts as the first temperature sensor along the plane A—A in FIG. 1. It goes without saying that the corresponding designs may also be considered for the second resistance element 12.

In the embodiment of the pressure cell which is shown in FIG. 4, the temperature-dependent resistance element 5 extends on a meander-shaped or zigzag-shaped path over essentially the entire circumference of the base body 1, namely from one of the through-contacts 9 to the other through-contact. This design makes it possible to accommodate a resistance element 5 with a length which is significantly longer than the circumferential length of the base body. In addition, this resistance element has a high resistance value and changes its resistance value with temperature in a correspondingly intense fashion.

In the embodiment according to FIG. 5, the temperature-dependent resistance element 5 extends within the material layer 4 on a spiral-shaped path. In this arrangement, the length of the resistance element 5 may also reach a multiple of the circumferential length of the base body 1. The peculiarity of this embodiment is that it allows a largely arbitrary positioning of the through-contacts 9 on the base body 1, e.g., at diametrically opposite positions as shown in FIG. 4 [sic; 5], because the length that the resistance element 5 may reach is not proportional to the angular spacing between the two through-contacts 9 in this case.

FIG. 6 elucidates the function of the temperature sensor according to the invention when it is subjected to a medium with varying temperature in the form of a time diagram. In this diagram, the line b represents the time history of the temperature of the medium. In the time interval between 0 and $t_1$, this temperature lies at a constant low value. The pressure cell is in thermal equilibrium with the medium; the temperature measured by the first temperature sensor shown in line c and the temperature shown in line d, which is measured by the second temperature sensor that is situated farther from the medium, are identical.

The membrane 2 of the pressure cell has a central curvature, as shown in the first schematic cross section in line a. This curvature is exclusively defined by the pressure of the medium that acts on the membrane.

The temperature of the medium abruptly increases to a higher value at time $t_1$. The temperature of membrane 2 rapidly follows this temperature increase because it has a small thickness, is in contact with the medium over its entire surface and is thermally insulated toward the base body 1 over the majority of its surface by chamber 3. Line d indicates that the base body 1 can only follow the temperature increase with a significant delay. This means that the second temperature sensor reaches an equilibrium temperature at a later time $t_2$. Consequently, the base body 1 is colder than the membrane 2 in the interval between $t_1$ and $t_2$, with the thermal expansion of the membrane being greater than that of the base body. However, since the base body and the membrane are rigidly connected on their circumference, the radial expansion of the membrane cannot exceed that of the base body. Consequently, the temperature increase causes a more intense curvature of the membrane 2 as illustrated in the second section of line a and thus a reduction in the distance between the membrane and the base body. In thermal equilibrium, this curvature of the membrane would correspond to a significantly higher pressure than the pressure to which the membrane is actually subjected. However, a downstream evaluation circuit is able to recognize that the pressure cell is not in thermal equilibrium and that the risk of a membrane deformation that is not correlated to the pressure exists based on the difference between the temperatures measured by the two temperature sensors, which is shown in line e.

As an alternative to [evaluating] the difference between the two temperatures, the evaluation circuit may also form and evaluate the derivative of the temperature measured by the first sensor which [derivatives] is shown in line f because its progression is similar to that of the difference. The second, rear temperature sensor is only required for a static temperature compensation of the delivered pressure measuring values in this case. However, it would also be conceivable to entirely eliminate the second temperature sensor and to use a variable derived from the output signal of the first sensor for the static temperature compensation. For example, the evaluation circuit may determine a compensation variable that adequately reproduces the progression of the temperature on the rear side of the pressure cell, i.e., the signal of the second temperature sensor (line d), by forming a sliding average value of the measuring signal of the first temperature sensor (line c) and by using a time delay.

Due to its simple design, such an evaluation circuit may distort the pressure measuring values delivered by the pressure cell if the difference between the temperatures measured by the two temperature sensors exceeds a given limit. However, it is also possible to calculate the extent of the expected deformation of the membrane caused by the thermal imbalance and to process or compensate the value delivered by the pressure cell in accordance with this deformation.

In practical applications, a characteristic that represents a value of the error in the pressure measurement as a function of the temperature difference between the two sensors may be stored in the evaluation circuit in order to carry out this compensation, with the compensation being realized by adding or subtracting this value to/from the pressure measuring signal that is not temperature-compensated. Due to these measures, usable pressure measuring values can also be obtained when the pressure cell is not in thermal equilibrium.

The third schematic cross section in line a shows the pressure cell after it has again reached thermal equilibrium at a higher temperature. If the base body and the membrane consist of the same ceramic material or have the same coefficient of thermal expansion, the curvature of the membrane 2 in this condition is identical to the curvature under the same pressure at a lower temperature.

At time $t_3$, the temperature of the medium abruptly decreases again. This causes the membrane 2 to contract faster than the base body 1. This also leads to curvature of the membrane 2 which [curvature] is shown in the fourth section in line a and is reduced in comparison to that at thermal equilibrium. The distance between the membrane 2 and the base body 1 consequently is increased, and the non-compensated pressure measuring value delivered by the pressure cell corresponds to a lower pressure than that actually acting upon the membrane. This error can also be corrected in the form of a calculation based on the difference between the temperatures measured by the two temperature sensors.

In the description of FIG. 6, it was assumed that the membrane 2, upon which the pressure acts, is concavely curved such that thermal expansion of the membrane corresponds to reduction in the distance between the membrane and the base body and therewith, an apparent increased pressure. Naturally, the invention can also be utilized with convex membranes, in which an increased temperature would lead to an increase in the distance from the base body 1.

In addition, the invention is not limited to pressure cells, in which the deformation of the membrane is measured in a capacitive fashion. The invention is suitable for all pressure cells with a movable element, the movement of which is not only influenced by the pressure to be measured, but also by temperature changes, and the position of which determines the non-compensated pressure measuring signal.

What is claimed is:

1. Pressure cell with:

a base body (1), a membrane (2) arranged on the base body (1) and is deformed by a pressure to be measured, and a first temperature sensor arranged between the membrane (2) and the base body (1) and embedded in a material layer (4) that connects the base body (1) and the membrane (2), characterized by a second temperature sensor that is spaced apart from the first temperature sensor in the direction of a temperature gradient.

2. Pressure cell according to claim 1, characterized by the fact that the first temperature sensor is arranged at the membrane.

3. Pressure cell according to claim 1, characterized by the fact that the distance between the first temperature sensor and an outer surface (11) of the membrane (2) which is subjected to the pressure to be measured lies between 0.1 and 3 mm.

4. Pressure cell according to claim 1, characterized by the fact that the material layer (4) consists of a seal that seals a chamber (3) formed between the base body (1) and the membrane (2).

5. Pressure cell according to claim 1, characterized by the fact that the base body (1) and/or the membrane (2) consist(s) of a ceramic material, and by the fact that the material layer (4) consists of glass.

6. Pressure cell according to claim 1, characterized by the fact that the first and/or the second temperature sensor contain(s) a resistance element (5,12) with a temperature-dependent resistance value.

7. Pressure cell according to claim 6, characterized by the fact that the resistance element (5) of the first temperature sensor essentially extends over the entire circumference of the material layer (4).

8. Pressure cell according to claim 6, characterized by the fact that the resistance element (5) extends in a meander-shaped fashion.

9. Pressure cell according to claim 1, characterized by the fact that the second temperature sensor is arranged on the side of the base body which faces away from the membrane.

10. Pressure cell according to claim 1, characterized by the fact that the first temperature sensor is arranged concentric on the base body.

11. Method for determining a pressure of a fluid with the aid of a pressure cell having:

a base body, a membrane arranged on the base body and is deformed by the pressure of the fluid, and a first temperature sensor arranged between the membrane and the base body and embedded in a material layer that connects the base body and the membrane, characterized by the fact that, if the speed of change in temperature measured by the first temperature sensor or a difference between temperatures measured by the first temperature sensor and a second temperature sensor spaced apart from the first temperature sensor in the direction of a temperature gradient indicates a temperature gradient in the pressure measuring cell, the method comprises the steps of:

calculating an error in the pressure measuring signal caused by the temperature gradient, correcting the pressure measuring value delivered by the pressure cell by the calculated error.

* * * * *